United States Patent
Tomsett et al.

(10) Patent No.: US 11,417,079 B2
(45) Date of Patent: Aug. 16, 2022

(54) VIEWFINDER ASSISTANT FOR VISUALLY IMPAIRED

(71) Applicant: International Business Machines Corporation, Armonk, NY (US)

(72) Inventors: Richard J. Tomsett, Southampton (GB); Corey Sonier, Baton Rouge, LA (US); William Kirby Wright, III, Metairie, LA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/928,455

(22) Filed: Jul. 14, 2020

(65) Prior Publication Data
US 2022/0019837 A1    Jan. 20, 2022

(51) Int. Cl.
*G06V 10/40*    (2022.01)
*G10L 13/00*    (2006.01)
(Continued)

(52) U.S. Cl.
CPC ........... *G06V 10/40* (2022.01); *G06K 9/6201* (2013.01); *G06V 20/00* (2022.01); *G06V 20/62* (2022.01);
(Continued)

(58) Field of Classification Search
CPC ........ G06K 9/46; G06K 9/6201; G06K 9/325; G06K 9/00624; G06K 2209/01;
(Continued)

(56) References Cited

U.S. PATENT DOCUMENTS 6,014,626 A    1/2000    Cohen
8,300,117 B2    10/2012    Carter et al.
(Continued)

FOREIGN PATENT DOCUMENTS

CN    101848335 B    6/2012

OTHER PUBLICATIONS

De Zoysa et al., "Project Bhashitha—Mobile Based Optical Character Recognition and Text-to-Speech System," 2018 13th International Conference on Computer Science & Education (ICCSE), 2018, pp. 1-5, doi: 10.1109/ICCSE.2018.8468858. (Year: 2018).*
(Continued)

*Primary Examiner* — Ping Y Hsieh
*Assistant Examiner* — Daniella M. DiGuglielmo
(74) *Attorney, Agent, or Firm* — Stephanie L. Carusillo (57) ABSTRACT

In an approach for guiding a visually impaired user to position a mobile device appropriately in relation to a screen so that dynamic information on the screen can be reliably extracted and conveyed to the visually impaired user, a processor receives an image captured by a camera of a mobile device. A processor performs object recognition on the image to identify a digital screen and a location of the digital screen in the image. A processor retrieves a template of the digital screen. A processor performs angle-sensitive optical character recognition (OCR) on the location of the digital screen in the image. Responsive to a processor determining text on the digital screen can be extracted, a processor conveys the text to a user. Responsive to a processor determining text on the digital screen cannot be extracted, a processor guides the user to re-orient the mobile device to capture a better image.

15 Claims, 3 Drawing Sheets

(51) Int. Cl.
- *G06K 9/62* (2022.01)
- *G06V 20/00* (2022.01)
- *G06V 20/62* (2022.01)
- *G06V 30/10* (2022.01)
- *G09B 21/00* (2006.01)

(52) U.S. Cl.
CPC ............. *G10L 13/00* (2013.01); *G06V 30/10* (2022.01); *G09B 21/001* (2013.01)

(58) Field of Classification Search
CPC ........ G10L 13/00; G06V 10/40; G06V 20/00; G06V 20/62; G06V 30/10; G09B 21/001
USPC .......................................................... 382/209
See application file for complete search history.

(56) References Cited

U.S. PATENT DOCUMENTS

| | | | |
|---|---|---|---|
| 8,320,708 B2 | 11/2012 | Kurzweil et al. | |
| 8,368,762 B1 | 2/2013 | Chen et al. | |
| 9,204,038 B2 | 12/2015 | Lord | |
| 10,108,617 B2 | 10/2018 | Jain | |
| 2006/0071950 A1* | 4/2006 | Kurzweil | G06K 9/3275 345/698 |
| 2012/0070090 A1 | 3/2012 | Chang et al. | |
| 2013/0155474 A1 | 6/2013 | Roach et al. | |
| 2014/0168478 A1* | 6/2014 | Baheti | G06K 9/3258 348/240.99 |
| 2014/0193075 A1* | 7/2014 | Pavani | G06K 9/18 382/182 |
| 2015/0146992 A1* | 5/2015 | Yeom | G06K 9/228 382/229 |

OTHER PUBLICATIONS

Tekin E, Coughlan JM. A Mobile Phone Application Enabling Visually Impaired Users to Find and Read Product Barcodes. Comput Help People Spec Needs. 2010;6180:290-295. doi: 10.1007/978-3-642-14100-3_43. (Year: 2010).*

Cutter M, Manduchi R. Towards Mobile OCR: How To Take a Good Picture of a Document Without Sight. Proc ACM Symp Doc Eng. 2015;2015:75-84. doi:10.1145/2682571.2797066. (Year: 2015).*

I. F. B. Hairuman and O. Foong, "OCR signage recognition with skew & slant correction for visually impaired people," 2011 11th International Conference on Hybrid Intelligent Systems (HIS), 2011, pp. 306-310, doi: 10.1109/HIS.2011.6122123. (Year: 2011).*

Mollah A. F., Basu S., Nasipuri M. "Text/Graphics Separation and Skew Correction of Text Regions of Business Card Images for Mobile Devices," arXiv, 2010, pp. 96-102. (Year: 2010).*

Neat L, Peng R, Qin S, Manduchi R. Scene Text Access: A Comparison of Mobile OCR Modalities for Blind Users. IUI. 2019;2019: 197-207. doi: 10.1145/3301275.3302271. (Year: 2019).*

Ma et al., "Arbitrary-Oriented Scene Text Detection via Rotation Proposals", arXiv:1703.01086v3 {cs.CV} Mar. 15, 2018, 11 pages.

* cited by examiner

VIEWFINDER ASSISTANT FOR VISUALLY IMPAIRED

BACKGROUND

The present invention relates generally to the field of data extraction, and more particularly to guiding a visually impaired user to position a mobile device appropriately in relation to a screen so that dynamic information on the screen can be reliably extracted and conveyed to the visually impaired user.

Assistive technology for blind or visually impaired users includes everything from screen readers or screen magnifiers to braille watches and braille printers. Screen readers are software programs that allow blind or visually impaired users to read the text that is displayed on a computer screen with a speech synthesizer or braille display. A screen reader is the interface between the computer's operating system, its applications, and the user. The user sends commands by pressing different combinations of keys on the computer keyboard or braille display to instruct the speech synthesizer what to say and to speak automatically when changes occur on the computer screen. A command can instruct the synthesizer to read or spell a word, read a line or full screen of text, find a string of text on the screen, announce the location of the computer's cursor or focused item, and so on. In addition, it allows users to perform more advanced functions, such as locating text displayed in a certain color, reading pre-designated parts of the screen on demand, reading highlighted text, and identifying the active choice in a menu. Users may also use the spell checker in a word processor or read the cells of a spreadsheet with a screen reader.

SUMMARY

Aspects of an embodiment of the present invention disclose a method, computer program product, and computer system for guiding a visually impaired user to position a mobile device appropriately in relation to a screen so that dynamic information on the screen can be reliably extracted and conveyed to the visually impaired user. A processor receives an image captured by a camera of a mobile device. A processor performs object recognition on the image to identify a digital screen and a location of the digital screen in the image. A processor retrieves a template of the digital screen. A processor performs angle-sensitive optical character recognition (OCR) on the location of the digital screen in the image. Responsive to a processor determining text on the digital screen can be extracted, a processor conveys the text to a user. Responsive to a processor determining text on the digital screen cannot be extracted, a processor guides the user to re-orient the mobile device to capture a better image.

In some aspects of an embodiment of the present invention, responsive to determining the text can be extracted, a processor audibly conveys the extracted text to the user using text-to-speech.

In some aspects of an embodiment of the present invention, responsive to determining the text cannot be extracted, a processor guides the user to re-orient at least one of a position and a rotation of the user mobile device to capture another image.

In some aspects of an embodiment of the present invention, a processor performs angle-sensitive OCR on the location of the digital screen in the image by detecting rectangular regions in the image that contain text, calculating angles of the rectangular regions relative to a horizontal axis, and converting text detected in these rectangular regions from image data to text data.

In some aspects of an embodiment of the present invention, the template indicates a set of locations of where text would be located on the digital screen. A processor compares locations of the rectangular regions in the image to the set of locations of where text would be located on the digital screen based on the template.

In some aspects of an embodiment of the present invention, a processor determines whether the text on the digital screen can be extracted based on comparing the locations of the rectangular regions in the image to the set of locations of where text would be located on the digital screen based on the template.

In some aspects of an embodiment of the present invention, when the angles of the rectangular regions are non-zero and consistent, a processor guides the user to re-orient a rotation of the user mobile device. When the angles of the rectangular regions are non-zero and inconsistent, a processor guides the user to re-orient a position and a rotation of the user mobile device.

DETAILED DESCRIPTION

Embodiments of the present invention recognize that reading information from digital screens and displays can be difficult for visually impaired persons, especially for visually impaired persons whose job requires them to read dynamic information from digital screens. For example, visually impaired physicians may need to read dynamic numerical information (i.e., vital sign information) from a patient monitoring system. Embodiments of the present invention intend to assist visually impaired persons by turning their mobile devices into a reliable tool for reading information displayed on digital screens. A key challenge with using mobile devices by visually impaired persons is the difficulty for visually impaired persons to align their mobile devices with a digital screen to obtain a good quality image that allows the information to be extracted. Embodiments of the present invention overcome this challenge by audibly guiding visually impaired persons for positioning their mobile devices and combining object recognition and angle-sensitive optical character recognition to extract information from digital screens.

Embodiments of the present invention provide a system and associated methods for guiding a visually impaired user to position a mobile device appropriately in relation to a screen so that dynamic information on the screen can be reliably extracted and conveyed to the visually impaired user. For example, an embodiment of the present invention guides a visually impaired physician to position their smart phone appropriately in relation to a vitals monitor enabling dynamic numerical information to be extracted from the vitals monitor and audibly conveyed to the visually impaired physician.

Embodiments of the present invention employ object recognition to identify a precise type (i.e., brand, make, model, and/or version) of the digital screen, angle-sensitive optical character recognition (OCR) to identify regions of text on the digital screen, and template matching to match the text to locations on a template specific to the digital screen type previously identified. If template matching fails based on an image captured by the mobile device of the visually impaired user, embodiments of the present invention guide the visually impaired user to position their mobile device to capture a better image of the digital screen. Embodiments of the present invention calculate how to guide the visually impaired user using text angles calculated using angle-sensitive OCR and provide guidance to the visually impaired user as a tactile cue (i.e., vibration), audio cue, or any other type of non-visual cue.

The present invention may contain various accessible data sources, such as server 110 and user mobile device 120, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Viewfinder assistant program 112 enables the authorized and secure processing of personal data. Viewfinder assistant program 112 provides informed consent, with notice of the collection of personal data, allowing the user to opt in or opt out of processing personal data.

Consent by a user can take several forms. Opt-in consent can impose on the user to take an affirmative action before personal data is processed. Alternatively, opt-out consent can impose on the user to take an affirmative action to prevent the processing of personal data before personal data is processed. Viewfinder assistant program 112 provides information regarding personal data and the nature (e.g., type, scope, purpose, duration, etc.) of the processing. Viewfinder assistant program 112 provides the user with copies of stored personal data. Viewfinder assistant program 112 allows the correction or completion of incorrect or incomplete personal data. Viewfinder assistant program 112 allows the immediate deletion of personal data.

The present invention will now be described in detail with reference to the Figures.

Figure 1:
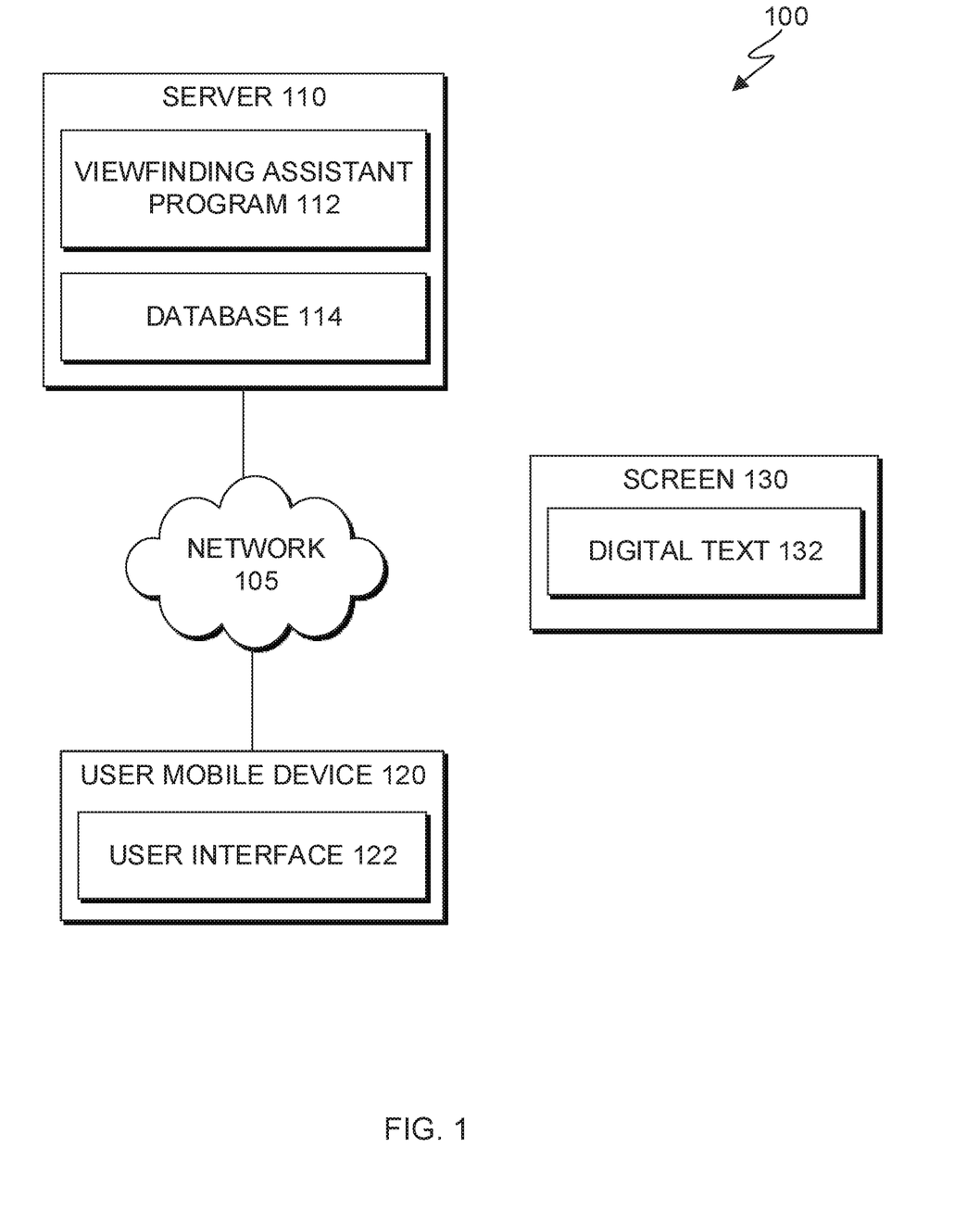
FIG. 1 depicts a block diagram of a distributed data processing environment, in accordance with an embodiment of the present invention.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes server 110 and user mobile device 120 interconnected over network 105. In an embodiment, distributed data processing environment 100 represents a system that guides a visually impaired user to position a mobile device appropriately in relation to a screen so that dynamic information on the screen can be reliably extracted and conveyed to the visually impaired user. Network 105 can be, for example, a local area network (LAN), a wide area network (WAN) such as the Internet, or a combination of the two, and can include wired, wireless, or fiber optic connections. Network 105 can include one or more wired and/or wireless networks that are capable of receiving and transmitting data, voice, and/or video signals, including multimedia signals that include voice, data, and video information. In general, network 105 can be any combination of connections and protocols that will support communications between server 110 and user mobile device 120. Distributed data processing environment 100 may include additional servers, computers, or other devices not shown.

Server 110 operates to run viewfinder assistant program 112 and manage database 114. In the depicted embodiment, server 110 contains viewfinder assistant program 112 and database 114. In some embodiments, server 110 can be a standalone computing device, a management server, a web server, or any other electronic device or computing system capable of receiving, sending, and processing data and capable of communicating with user mobile device 120 via network 105. In other embodiments, server 110 represents a server computing system utilizing multiple computers as a server system, such as a cloud computing environment. In yet other embodiments, server 110 represents a computing system utilizing clustered computers and components (e.g., database server computers, application server computers, etc.) that act as a single pool of seamless resources when accessed within distributed data processing environment 100. Server 110 may include components as described in further detail in FIG. 3.

Viewfinder assistant program 112 operates to guide a visually impaired user to position a mobile device appropriately in relation to a screen so that dynamic information on the screen can be reliably extracted and conveyed to the visually impaired user. In the depicted embodiment, viewfinder assistant program 112 resides on server 110 with user interface 122 being a local app interface of viewfinder assistant program 112 running on user mobile device 120. In other embodiments, viewfinder assistant program 112 may be run locally on user mobile device 120 or on another device (not shown) provided that viewfinder assistant program 112 has access to network 105. In yet other embodiments, certain steps of viewfinder assistant program 112 can be run on server 110 and other steps viewfinder assistant program 112 can be run on user mobile device 120 provided that viewfinder assistant program 112 has access to network 105 to exchange information between server 110 and user mobile device 120. Viewfinder assistant program 112 is described in more detail below with reference to FIG. 2.

Database 114 operates as a repository for data received, used, and/or output by viewfinder assistant program 112. Data received, used, and/or generated may include, but is not limited to, images captured by user mobile device 120; templates associated with known digital screens; data output from object recognition performed on images; data output from angle-sensitive OCR performed on images; text extracted from images; and any other data received, used, and/or output by viewfinder assistant program 112. Database 114 can be implemented with any type of storage device capable of storing data and configuration files that can be accessed and utilized by server 110, such as a hard disk drive, a database server, or a flash memory. In an embodiment, database 114 is accessed by server 110, viewfinder assistant program 112, and/or user mobile device 120 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that database 114 has access to network 105.

User mobile device 120 operates as a mobile computing device that can send and receive data through a user interface. In some embodiments, user mobile device 120 may be, but is not limited to, an electronic device, such as a laptop computer, a tablet computer, a netbook computer, a personal computer (PC), a desktop computer, a smart phone, a wearable computing device, or any programmable electronic device capable of running user interface 122 and communicating (i.e., sending and receiving data) with server 110 and/or viewfinder assistant program 112 via network 105. In some embodiments, user mobile device 120 represents one or more programmable electronic devices or combination of programmable electronic devices capable of executing machine readable program instructions and communicating with server 110 and/or other computing devices within distributed data processing environment 100 via a network, such as network 105. In an embodiment, user mobile device 120 comprises a rear facing camera for capturing images analyzed by viewfinder assistant program 112. In an embodiment, user mobile device 120 represents one or more devices associated with one or more users. In the depicted embodiment, user mobile device 120 includes an instance of user interface 122. User mobile device 120 may include components as described in further detail in FIG. 3.

User interface 122 operates as a local user interface on user mobile device 120 through which one or more users of user mobile device 120 interact with user mobile device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from viewfinder assistant program 112 via network 105. In an embodiment, user interface 122 enables a user to send and receive data (i.e., to and from viewfinder assistant program 112 via network 105, respectively). In an embodiment, user interface 122 enables a user to capture images (i.e., take pictures) to be analyzed by viewfinder assistant program 112 enabling information from a digital screen to be extracted and presented to the user.

Screen 130 operates as a digital screen or display that displays textual information and/or numerical information. In the depicted embodiment, screen 130 operates as a digital screen that displays digital text 132. Digital text 132 represents any form of textual or numerical information that can be displayed on a digital screen, e.g., dynamic numerical information. For example, screen 130 may be a vital signs monitoring device that displays digital text 132 in the form of dynamic numerical vital information, e.g., dynamic numerical values for heart rate, blood pressure, oxygen saturation, and temperature. In several embodiments, digital text 132 of screen 130 is what viewfinder assistant program 112 extracts and conveys to a visually impaired user of user mobile device 120 after guiding the visually impaired user to position user mobile device 120 appropriately in relation to digital text 132 of screen 130.

Figure 2:
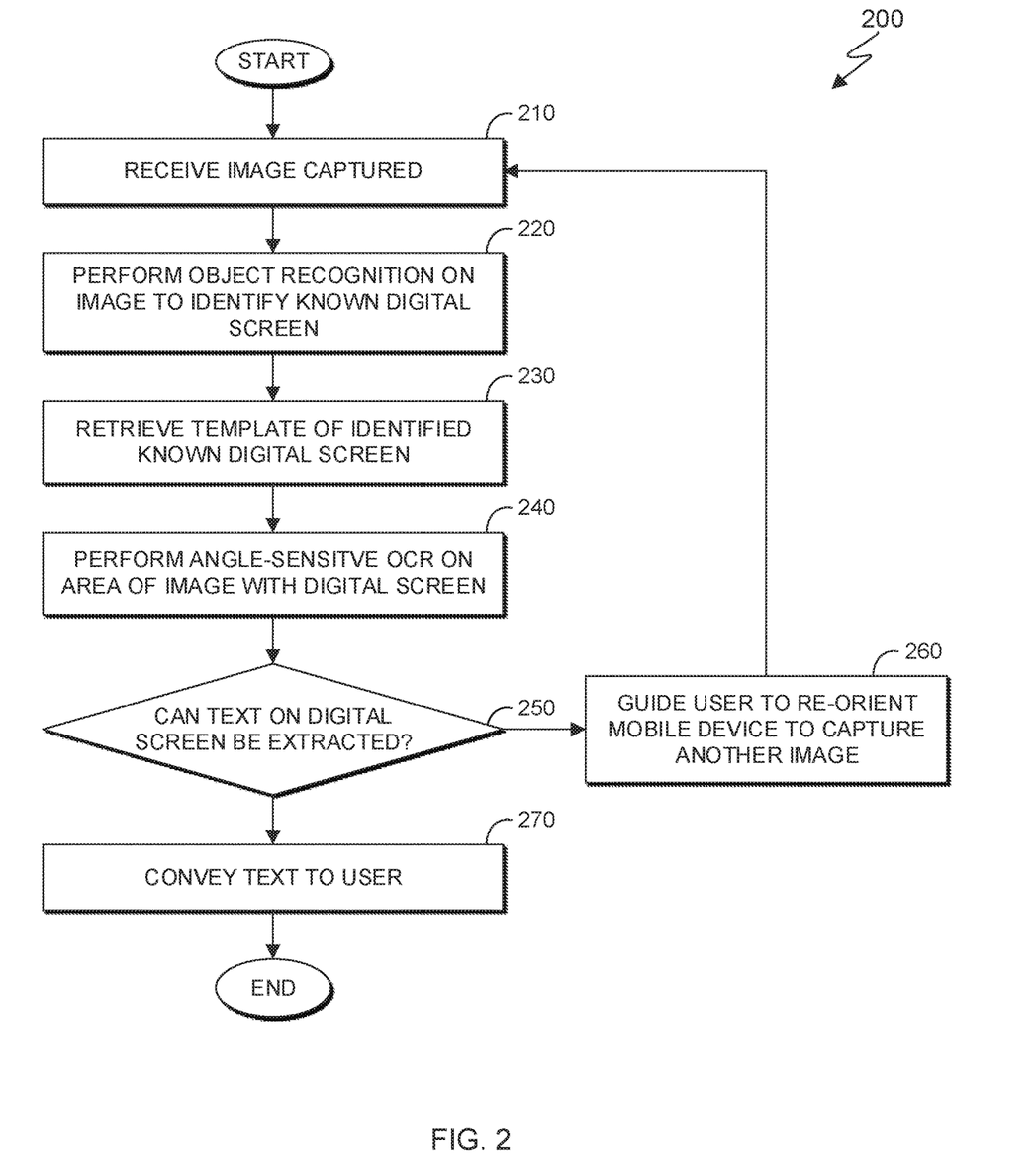
FIG. 2 depicts a flowchart of the steps of a viewfinder assistant program, for guiding a visually impaired user to position a mobile device appropriately in relation to a screen so that dynamic information on the screen can be reliably extracted and conveyed to the visually impaired user, in accordance with an embodiment of the present invention.

FIG. 2 depicts a flowchart 200 of the steps of viewfinder assistant program 112, for guiding a visually impaired user to position a mobile device appropriately in relation to a screen so that dynamic information on the screen can be reliably extracted and conveyed to the visually impaired user, in accordance with an embodiment of the present invention. In an embodiment, viewfinder assistant program 112 receives an image captured on a mobile device, performs object recognition on the image, retrieves a template for a known digital screen, performs angle-sensitive OCR on the image, determines whether text on the known digital screen can be extracted, and either conveys the extracted text to a user or guides the user to re-orient the mobile device to capture a better image for extraction. It should be appreciated that the process depicted in FIG. 2 illustrates one possible iteration of viewfinder assistant program 112.

In step 210, viewfinder assistant program 112 receives an image captured on a user mobile device. In an embodiment, viewfinder assistant program 112 receives an image captured by a user using a camera on a user mobile device, e.g., user mobile device 120. For example, responsive to a visually impaired user roughly positioning a rear-facing camera of user mobile device 120 to capture an image of digital text 132 on screen 130 and capturing the image, viewfinder assistant program 112 receives the image. In some embodiments, the image captured is stored in a database, e.g., database 114, and viewfinder assistant program 112 retrieves or receives the image from the database. In some embodiments, viewfinder assistant program 112 receives more than one image captured on the user mobile device.

In step 220, viewfinder assistant program 112 performs object recognition on the image. In an embodiment, viewfinder assistant program 112 performs object recognition on the image to identify a known digital screen in the image. In an embodiment, responsive to viewfinder assistant program 112 receiving the image, viewfinder assistant program 112 performs object recognition on the image to identify a known digital screen in the image. In an embodiment, viewfinder assistant program 112 uses object recognition to identify a digital screen in the image that is of a known brand, type, model, etc. In an embodiment, viewfinder assistant program 112 performs object recognition on the image to identify and locate a known digital screen in the image.

In step 230, viewfinder assistant program 112 retrieves a template for the known digital screen. In an embodiment, viewfinder assistant program 112 retrieves a template associated with the known digital screen, in which the template indicates where text would be located on the digital screen. In an embodiment, responsive to viewfinder assistant program 112 performing object recognition of the image and identifying a known digital screen in the image, viewfinder assistant program 112 retrieves a template for the known digital screen. In an embodiment, viewfinder assistant program 112 retrieves a template from a database, e.g., database 114, or a cloud database of digital screen templates.

In step 240, viewfinder assistant program 112 performs angle-sensitive OCR on an area of the image with the known digital screen. In an embodiment, viewfinder assistant program 112 performs angle-sensitive OCR on an area of the image based on the location of the known digital screen in the image indicated by object recognition performed previously. In an embodiment, responsive to viewfinder assistant program 112 retrieving the template, viewfinder assistant program 112 performs angle-sensitive OCR on the area of the image with the known digital screen. In an embodiment, viewfinder assistant program 112 utilizes angle-sensitive OCR to detect rectangular regions in the image that contain text, calculate an angle of the rectangular regions relative to a horizontal axis, and convert text detected in these rectangular regions from image data to text data. In an embodiment, viewfinder assistant program 112 compares a location of the rectangular regions in the image to expected text locations based on the template retrieved. In an embodiment, viewfinder assistant program 112 uses standard image processing and/or warping and template matching techniques as known to a person of skill in the art for the comparison.

In decision 250, viewfinder assistant program 112 determines whether text on the known digital screen can be extracted. In an embodiment, responsive to viewfinder assistant program 112 performing angle-sensitive OCR on the area of the image with the known digital screen, viewfinder assistant program 112 determines whether text on the known digital screen can be extracted. In an embodiment, viewfinder assistant program 112 determines whether text on the known digital screen can be extracted based on the comparison, i.e., whether the rectangular regions overlap significantly with the expected text locations based on the template retrieved. In an embodiment, viewfinder assistant program 112 determines whether the overlap is significant or not based on a pre-defined threshold, in which the pre-defined threshold can be preset by the system and/or can be set or modified by a user.

If viewfinder assistant program 112 cannot match the location of the rectangular regions in the image to the expected text locations based on the template retrieved, i.e., the rectangular regions do not overlap significantly with the expected text locations based on the template retrieved, then viewfinder assistant program 112 determines the text on the known digital screen in the image cannot be extracted. If viewfinder assistant program 112 determines the text on the known digital screen in the image cannot be extracted (decision 250, NO branch), then viewfinder assistant program 112 moves on to guide the user to re-orient the user mobile device to capture another image (step 260).

In step 260, viewfinder assistant program 112 guides the user to re-orient the user mobile device to capture another image. In an embodiment, viewfinder assistant program 112 guides the user to re-orient a position and/or rotation of the user mobile device to capture a better image. In an embodiment, viewfinder assistant program 112 guides the user based on angles of the rectangular regions of text detected using angle-sensitive OCR. In an embodiment, viewfinder assistant program 112 guides the user to re-orient the user mobile device via a vibrational feedback and/or audio cue. For example, viewfinder assistant program 112 could audibly cue the user to tilt the user mobile device upwards until a vibrational feedback is felt. In an embodiment, once the user re-orients the user mobile device as suggested and another image is captured by the camera of the user mobile device, viewfinder assistant program 112 returns to step 210.

If the angles are non-zero but consistent, the user mobile device is well aligned with a plane of the digital screen but needs to be rotated to obtain an image parallel with a horizontal axis of the digital screen. In an embodiment, responsive to identifying that the angles are non-zero and consistent, viewfinder assistant program 112 guides the user to rotate the user mobile device. In an embodiment, viewfinder assistant program 112 determines how to guide the user to re-orient a rotation of the user mobile device based on the angles of the rectangular regions relative to a horizontal axis calculated using angle-sensitive OCR.

If the angles are non-zero but inconsistent, the user mobile device is not parallel with the horizontal plane of the digital screen. In an embodiment, responsive to identifying that the angles are non-zero and inconsistent, viewfinder assistant program 112 determines a relevant correction based on how the angles are inconsistent using the rules of perspective. For example, if the angles of text regions higher in the image are closer to a horizontal plane than the angles of text regions at the bottom of the image, with the angles of the text regions at the bottom tilting more counter-clockwise, the user mobile device is located closer to the top of the digital screen than the bottom, and the digital screen is angled away from the user mobile device with the right side of the digital screen farther away than the left side of the digital screen. Based on this example, viewfinder assistant program 112 guides the user to move the user mobile device downwards and rotate a right-hand side of the user mobile device forward.

Returning to decision 250, if viewfinder assistant program 112 can match the location of the rectangular regions in the image to the expected text locations based on the template retrieved, i.e., the rectangular regions do overlap significantly with the expected text locations based on the template retrieved, then viewfinder assistant program 112 determines the text on the known digital screen in the image can be extracted. If viewfinder assistant program 112 determines the text on the known digital screen in the image can be extracted (decision 250, YES branch), then viewfinder assistant program 112 moves on to convey the text to user (step 270).

In step 270, viewfinder assistant program 112 conveys the extracted text to the user. In an embodiment, viewfinder assistant program 112 audibly conveys the extracted text to the user using text-to-speech.

Figure 3:
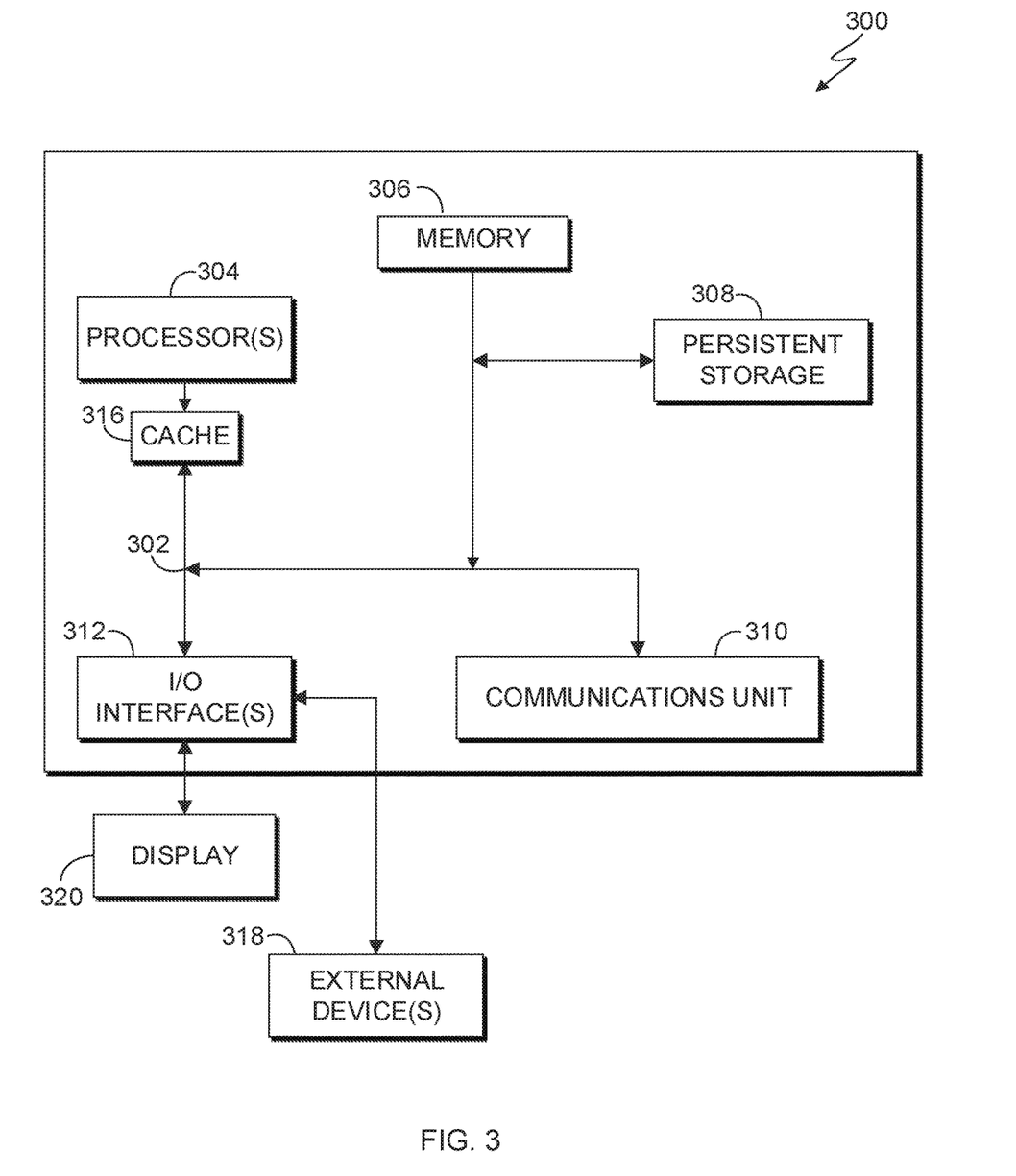
FIG. 3 depicts a block diagram of a computing device of the distributed data processing environment, in accordance with an embodiment of the present invention.

FIG. 3 depicts a block diagram of components of computing device 300 suitable for server 110 and/or user mobile device 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110 and/or user mobile device 120. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more processors, an image captured by a camera of a user mobile device;
   performing, by the one or more processors, object recognition on the image to identify a digital screen and a location of the digital screen in the image, wherein the digital screen is identified to be of a known type, brand, or model of digital screen;
   retrieving, by the one or more processors, a template of the digital screen based on the known type, brand, or model of digital screen;
   performing, by the one or more processors, angle-sensitive optical character recognition (OCR) on the location of the digital screen in the image to detect rectangular regions in the image that contain text and calculate an angle of the rectangular regions relative to a horizontal axis;
   determining, by the one or more processors, whether, within the image, the text on the digital screen can be extracted based on whether the rectangular regions overlap within a pre-defined threshold with expected text locations based on the template; and
   responsive to determining the text cannot be extracted, guiding, by the one or more processors, a user of the user mobile device to re-orient at least one of a position and a rotation of the user mobile device based on the angle calculated using the angle-sensitive OCR to capture another image.

2. The computer-implemented method of claim 1, further comprising:
   responsive to determining the text can be extracted, audibly conveying, by the one or more processors, the text to a user of the user mobile device using text-to-speech.

3. The computer-implemented method of claim 1, wherein performing angle-sensitive OCR on the location of the digital screen in the image comprises:
   detecting, by the one or more processors, rectangular regions in the image that contain text;
   calculating, by the one or more processors, angles of the rectangular regions relative to a horizontal axis; and
   converting, by the one or more processors, text detected in these rectangular regions from image data to text data.

4. The computer-implemented method of claim 3, further comprising:
   wherein the template indicates a set of locations of where text would be located on the digital screen; and
   comparing, by the one or more processors, locations of the rectangular regions in the image to the set of locations of where text would be located on the digital screen based on the template.

5. The computer-implemented method of claim 4, wherein determining whether the text on the digital screen can be extracted is based on comparing the locations of the rectangular regions in the image to the set of locations of where text would be located on the digital screen based on the template.

6. A computer program product comprising:
   one or more computer readable storage media and program instructions stored on the one or more computer readable storage media, the program instructions comprising:
   program instructions to receive an image captured by a camera of a user mobile device;
   program instructions to perform object recognition on the image to identify a digital screen and a location of the digital screen in the image, wherein the digital screen is identified to be of a known type, brand, or model of digital screen;
   program instructions to retrieve a template of the digital screen based on the known type, brand, or model of digital screen;
   program instructions to perform angle-sensitive optical character recognition (OCR) on the location of the digital screen in the image to detect rectangular regions in the image that contain text and calculate an angle of the rectangular regions relative to a horizontal axis;
   program instructions to determine whether, within the image, text on the digital screen can be extracted based on whether the rectangular regions overlap within a pre-defined threshold with expected text locations based on the template; and
   responsive to determining the text cannot be extracted, program instructions to guide a user of the user mobile device to re-orient at least one of a position and a rotation of the user mobile device based on the angle calculated using the angle-sensitive OCR to capture another image.

7. The computer program product of claim 6, further comprising:
responsive to determining the text can be extracted, program instructions to audibly convey the text to a user of the user mobile device using text-to-speech.

8. The computer program product of claim 6, wherein the program instructions to perform angle-sensitive OCR on the location of the digital screen in the image comprise:
program instructions to detect rectangular regions in the image that contain text;
program instructions to calculate angles of the rectangular regions relative to a horizontal axis; and
program instructions to convert text detected in these rectangular regions from image data to text data.

9. The computer program product of claim 8, further comprising:
wherein the template indicates a set of locations of where text would be located on the digital screen; and
program instructions to compare locations of the rectangular regions in the image to the set of locations of where text would be located on the digital screen based on the template.

10. The computer program product of claim 9, wherein the program instructions to determine whether the text on the digital screen can be extracted is based on comparing the locations of the rectangular regions in the image to the set of locations of where text would be located on the digital screen based on the template.

11. A computer system comprising:
one or more computer processors;
one or more computer readable storage media;
program instructions stored on the computer readable storage media for execution by at least one of the one or more processors, the program instructions comprising:
program instructions to receive an image captured by a camera of a user mobile device;
program instructions to perform object recognition on the image to identify a digital screen and a location of the digital screen in the image, wherein the digital screen is identified to be of a known type, brand, or model of digital screen;
program instructions to retrieve a template of the digital screen based on the known type, brand, or model of digital screen;
program instructions to perform angle-sensitive optical character recognition (OCR) on the location of the digital screen in the image to detect rectangular regions in the image that contain text and calculate an angle of the rectangular regions relative to a horizontal axis;
program instructions to determine whether, within the image, text on the digital screen can be extracted based on whether the rectangular regions overlap within a pre-defined threshold with expected text locations based on the template; and
responsive to determining the text cannot be extracted, program instructions to guide a user of the user mobile device to re-orient at least one of a position and a rotation of the user mobile device based on the angle calculated using the angle-sensitive OCR to capture another image.

12. The computer system of claim 11, further comprising:
responsive to determining the text can be extracted, program instructions to audibly convey the text to a user of the user mobile device using text-to-speech.

13. The computer system of claim 11, wherein the program instructions to perform angle-sensitive OCR on the location of the digital screen in the image comprise:
program instructions to detect rectangular regions in the image that contain text;
program instructions to calculate angles of the rectangular regions relative to a horizontal axis; and
program instructions to convert text detected in these rectangular regions from image data to text data.

14. The computer system of claim 13, further comprising:
wherein the template indicates a set of locations of where text would be located on the digital screen; and
program instructions to compare locations of the rectangular regions in the image to the set of locations of where text would be located on the digital screen based on the template.

15. The computer system of claim 14, wherein the program instructions to determine whether the text on the digital screen can be extracted is based on comparing the locations of the rectangular regions in the image to the set of locations of where text would be located on the digital screen based on the template.

* * * * *